US007983004B2

United States Patent
Shirotori et al.

(10) Patent No.: US 7,983,004 B2
(45) Date of Patent: Jul. 19, 2011

(54) MAGNETIC RECORDING MEDIUM WITH MAGNETIC FILM PATTERN SIDEWALLS HAVING AT LEAST TWO FACES OF DIFFERENT SLOPE ANGLES AND MAGNETIC RECORDING APPARATUS HAVING THE SAME

(75) Inventors: Satoshi Shirotori, Fuchu (JP); Masatoshi Sakurai, Tokyo (JP); Yoshiyuki Kamata, Tokyo (JP); Akira Kikitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 732 days.

(21) Appl. No.: 11/822,132

(22) Filed: Jul. 2, 2007

(65) Prior Publication Data
US 2008/0002297 A1  Jan. 3, 2008

(30) Foreign Application Priority Data

Jul. 3, 2006 (JP) ................................. 2006-183713

(51) Int. Cl.
*G11B 5/82* (2006.01)
(52) U.S. Cl. ....................................................... 360/135
(58) Field of Classification Search .................. None
See application file for complete search history.

(56) References Cited

U.S. PATENT DOCUMENTS

| 5,772,905 | A | 6/1998 | Chou |
| 7,394,622 | B2 * | 7/2008 | Gage et al. ................. 360/135 |
| 2004/0023162 | A1 | 2/2004 | Hasegawa et al. |
| 2005/0243467 | A1 * | 11/2005 | Takai et al. ................. 360/135 |

FOREIGN PATENT DOCUMENTS

| JP | 02-014417 | 1/1990 |
| JP | 05-205257 | 8/1993 |
| JP | 08-203058 | 8/1996 |
| JP | 2000-232095 | 8/2000 |
| JP | 3581799 | 7/2004 |
| JP | 2005-317155 | 11/2005 |
| JP | 2006-031743 | 2/2006 |

OTHER PUBLICATIONS

Japanese Office Action dated Mar. 16, 2010 for Appln. No. 2006-183713.

* cited by examiner

*Primary Examiner* — David D Davis
(74) *Attorney, Agent, or Firm* — Pillsbury Winthrop Shaw Pittman, LLP

(57) ABSTRACT

According to one embodiment, there is provided a magnetic recording media including a substrate, and a magnetic recording layer including magnetic film patterns formed in a protruded form on the substrate, sidewalls of the magnetic film patterns having at least two faces of different slope angles.

7 Claims, 4 Drawing Sheets

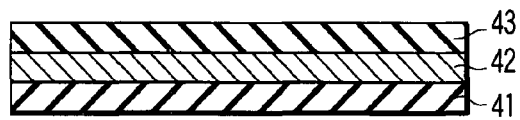
F I G. 5A
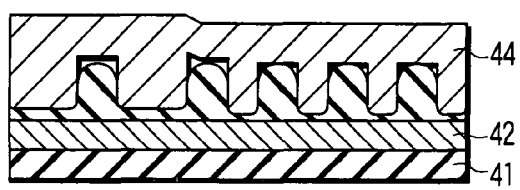
F I G. 5B
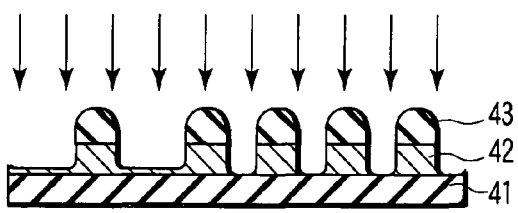
F I G. 5C
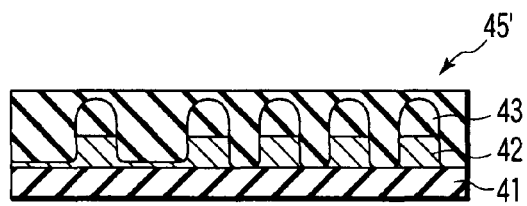
F I G. 5D
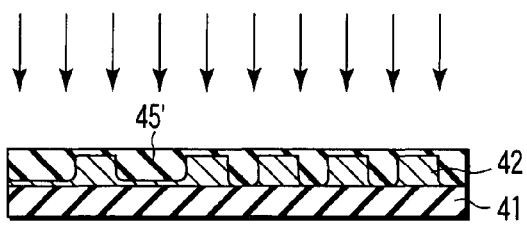
F I G. 5E
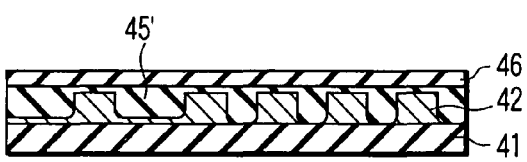
F I G. 5F
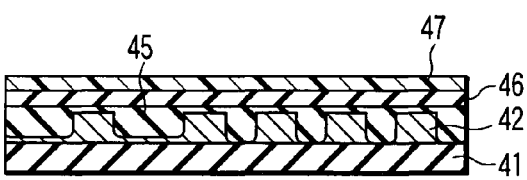
F I G. 5G

MAGNETIC RECORDING MEDIUM WITH MAGNETIC FILM PATTERN SIDEWALLS HAVING AT LEAST TWO FACES OF DIFFERENT SLOPE ANGLES AND MAGNETIC RECORDING APPARATUS HAVING THE SAME

CROSS-REFERENCE TO RELATED APPLICATIONS

This application is based upon and claims the benefit of priority from Japanese Patent Application No. 2006-183713, filed Jul. 3, 2006, the entire contents of which are incorporated herein by reference.

BACKGROUND

1. Field

One embodiment of the present invention relates to a magnetic recording media and a magnetic recording apparatus.

2. Description of the Related Art

In recent years, in order to cope with further high density of the magnetic recording media, a discrete track recording media (DTR media) attracts attention. In the DTR media, adjacent recording tracks are separated by nonmagnetic materials so as to reduce magnetic interference between them. When such a discrete track recording media is manufactured, magnetic film patterns corresponding to signals of servo regions should desirably be formed together with magnetic film patterns which form recording tracks by imprinting using a stamper. If the patterns are formed in this manner, the cost can be reduced since a servo-track writing process can be eliminated.

As a typical imprinting method, the following method is known (U.S. Pat. No. 5,772,905). Firstly, polymethyl methacrylate (PMMA), which is a thermoplastic resin, is coated on a silicon substrate as resist, and heat cycle nano-imprinting is carried out using a stamper to transfer the patterns of the stamper to the resist. After the stamper is removed, residues remained in recesses between resist patterns are removed by oxygen reactive ion etching (RIE) to expose the surface of silicon. Then, etching is carried out using the resist patterns as masks to form protruded patterns of silicon.

However, when the above method is used to manufacture the DTR media as it is, it has been found that problems may arise in the deterioration of thermal fluctuation resistance specific to the magnetic recording, or problems may arise that the surface comes to have poor flatness when a nonmagnetic material is filled in the recesses between magnetic film patterns.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 5A, 5B, 5C, 5D, 5E, 5F, and 5G are cross-sectional views to show a method of manufacturing a magnetic recording media according to another embodiment;

DETAILED DESCRIPTION

Various embodiments according to the invention will be described hereinafter with reference to the accompanying drawings. In general, according to one embodiment of the present invention, there is provided a magnetic recording media comprising: a substrate; and a magnetic recording layer including magnetic film patterns formed in a protruded form on the substrate, sidewalls of the magnetic film patterns having at least two faces of different slope angles.

Figure 1:
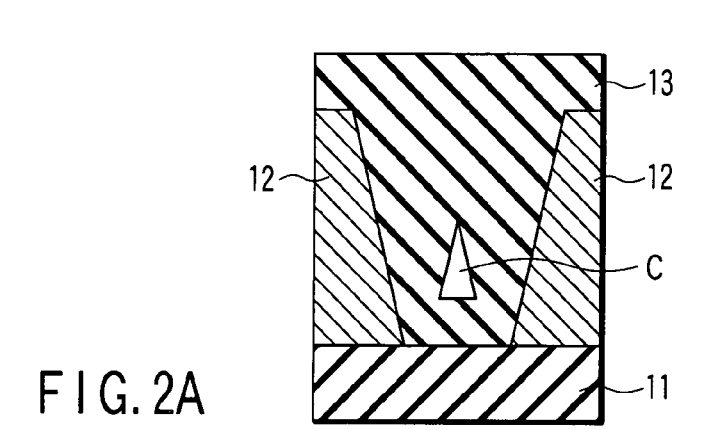
FIG. 1 is a cross-sectional view of a magnetic recording media according to an embodiment.

FIG. 1 shows a cross-sectional view of a magnetic recording media according to an embodiment. As shown in FIG. 1, this magnetic recording media has a substrate 11 (including an underlayer and an intermediate layer), magnetic film patterns 12 in a protruded form formed on the substrate 11, and filling layers 13 filled in the recesses between the magnetic film patterns 12. As shown in the cross-sectional view in FIG. 1, the sidewalls of the magnetic film patterns 12 forms curved faces which gradually become gentler from the top part toward the bottom part. Such a structure can be formed by modifying a method of manufacturing the magnetic recording media, as will be described below. The sidewalls of the magnetic film patterns 12 need to only include two or more faces with different slope angles.

As shown in FIG. 1, in the magnetic recording media of the present embodiment, a magnetic film is left in a form of footing at the bottom part of the magnetic film patterns 12. For this reason, the volume (V) of the magnetic film pattern 12 increases and KuV/kT also increases (where Ku is an anisotropic constant, k is a Boltzmann constant, and T is an absolute temperature). As a result, the thermal fluctuation resistance is improved.

Figure 2A:
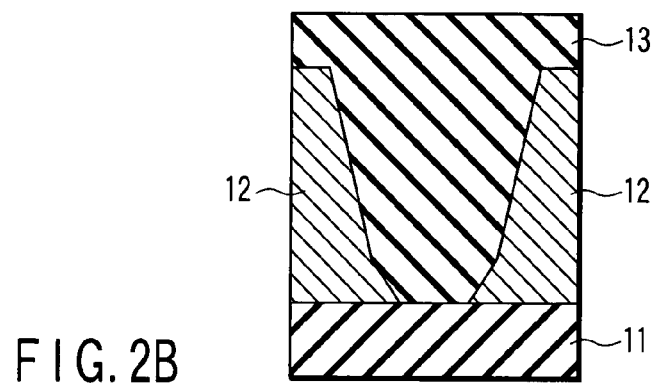
FIGS. 2A, 2B, and 2C are cross-sectional views showing shapes of sidewalls of magnetic film patterns and a state of filling layers.
Figure 2B:
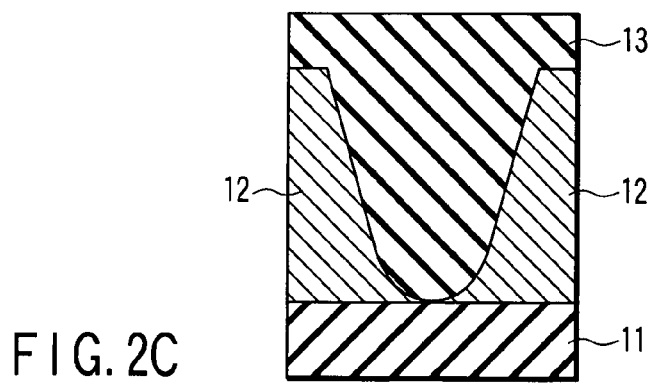
Figure 2C:
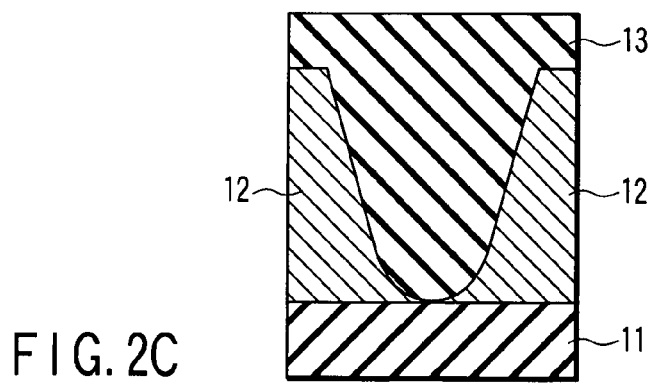

In the magnetic recording media according to the embodiment, an advantage that the filling layers 13 can be formed excellently is also obtained. With reference to FIGS. 2A, 2B, and 2C, a description will be given of the shapes of the sidewalls of the magnetic film patterns and the state of the filling layers 13.

Usually, the magnetic film patterns 12 are processed so that slope angles of sidewalls become 40 to 80°. As shown in FIG. 2A, when the sidewalls of the magnetic film patterns 12 are formed by one face having a slope angle close to 90°, a cavity C is formed in an filling layer 13 in the case where the filling layer is formed by a dry process such as sputtering. Formation of the cavity causes disadvantageous problems such as corrosion of the magnetic film. On the contrary, when the sidewalls of the magnetic film patterns 12 are formed by faces having slope angles less than 40°, signals may be written into the sidewalls, and there is a possibility of noises becoming larger when signals are read with the read head.

As shown in FIG. 2B, when the sidewalls of the magnetic film pattern 12 are formed by two faces of different slope angles, good filling can be achieved even if a bias voltage is not applied when depositing the filling layer 13 by means of a dry process such as sputtering, and no cavity is formed in the filling layer. Moreover, if the slope angle is made gentle in the region less than one half of the height of the magnetic film pattern 12, no signal is written into that region, and noise does not become a problem.

As shown in FIG. 2C, when the sidewalls of the magnetic film patterns 12 are formed by a curved face or faces with a number of faces having different slope angles, the filling layer 13 can be filled uniformly in the recesses between the magnetic film patterns 12 by the dry process such as sputtering.

The filling layer may be formed by a wet process, as will be described later. Moreover, the filling layer need not be formed. Even in the case where the filling layer is not formed, the magnetic film remained in a form of footing at the bottom part of the magnetic film patterns 12 ensures reliable flying characteristics of the head slider.

In the magnetic recording media according to the embodiment, an effect of improving surface flatness is also obtained when the filling layer is filled in between the magnetic film patterns. In a patterned media including a DTR media, there exist some regions in which the occupation area rates of the magnetic film patterns (or recesses) are different. For example, the occupation area rates of the magnetic film patterns are: about 50% for the address part and preamble part of the servo region, about 75% for the burst part of the servo region, and about 67% for the data region, respectively. In such a structure, since a region with a larger area of recesses has a larger volume for the nonmagnetic material to be filled in the recesses compared with a region with a smaller area of recesses, the height of the nonmagnetic material after filling becomes lower. This phenomenon adversely affects the surface flatness after the filling layer is formed.

Figure 3:
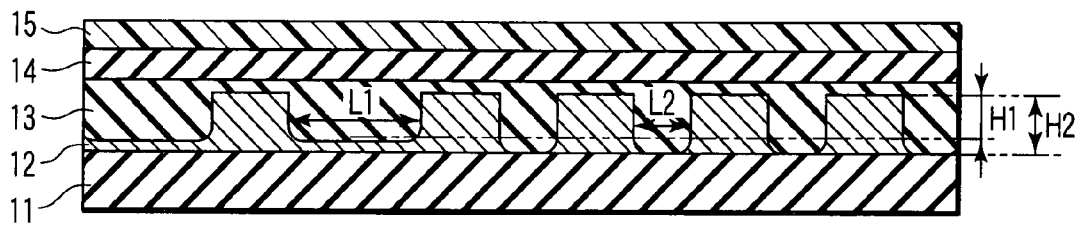
FIG. 3 is a cross-sectional view of a magnetic recording media according to the embodiment.

Referring to the cross-sectional view shown in FIG. 3, a description will be given as to how the surface flatness can be improved after the filling layer is formed in the magnetic recording media according to the embodiment. As shown in FIG. 3, the magnetic film patterns 12 are formed on the substrate 11, and the filling layer 13 is formed in the recesses between the magnetic film patterns 12. A protection film 14 is formed on them, and a lubricant 15 is applied. In the embodiment shown in FIG. 3, the height difference of the magnetic film patterns in the region with a larger area of recesses (L1) is made smaller than the height difference of the magnetic film patterns in the region with a smaller area of recesses (L2). In other words, by realizing the condition that H1<H2, the difference of the volumes of the filling layers to be filled in both regions of L1 and L2 can be moderated. Accordingly, even in the regions where the occupation area rates of the magnetic film patterns (or recesses) are different, the surface flatness after the filling layers are formed can be improved. The structure in which the height differences of the magnetic film pattern meets the condition of H1<H2 can be formed by modifying a method of manufacturing the magnetic recording media as described later.

The shape of the sidewalls and the height difference of the magnetic film patterns can be observed by measuring cross sections by use of an atomic force microscope (AFM), a scanning electron microscope (SEM), or a transmission electron microscope (TEM). Moreover, the sidewalls of the magnetic film patterns can be observed even after the formation of the filling layer, by measuring cross sections by means of SEM or TEM.

Next, a method of manufacturing a magnetic recording media according to the embodiment will be explained with reference to FIGS. 4A, 4B, 4C, 4D, 4E, 4F, 4G, and 4H.

Figure 4A:
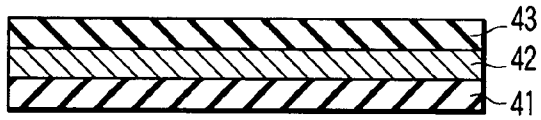
FIGS. 4A, 4B, 4C, 4D, 4E, 4F, 4G, and 4H are cross-sectional views showing a method of manufacturing a magnetic recording media according to an embodiment.
Figure 4E:
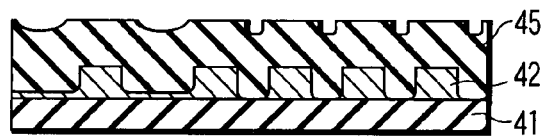

As shown in FIG. 4A, a magnetic film is formed on a substrate 41. For example, lithium based crystallized glass can be used as the substrate 41. On the substrate 41, for example, a soft underlayer of high magnetic permeability and a perpendicular recording layer are formed, thereby obtaining a so-called perpendicular double-layer media. As the soft underlayer, a CoZr-, CoZrNb-, or CoZrTa-based alloy can be used, for example. As the perpendicular recording layer, a CoCrPt-based alloy or the like can be used. Moreover, an intermediate layer made of a nonmagnetic film may be formed between the soft underlayer and the perpendicular recording layer to block exchange coupling interaction between the soft underlayer and the perpendicular recording layer and to control crystallinity of the perpendicular recording layer. As materials of the intermediate layer, Ru, Pt, Pd, W, Ti, Ta, Cr, Si, or an alloy containing them, or their oxides or nitrides can be used. However, structure of the media is not limited thereto. In the figures, the substrate 41 is supposed to include the underlayer and the intermediate layer, and the magnetic film 42 represents the perpendicular recording layer.

Next, a resist 43 for imprinting is coated on the magnetic film 42. As the resist 43, a material suitable for a process such as etching performed after the imprinting process is selected depending on a high-density recording media to be fabricated. The resist 43 is required to be softer than a stamper material so that patterns of recesses and protrusions on the stamper surface can be transferred surely in imprinting, and to have sufficient stability to retain the patterns transferred after the imprinting at room temperature. Thus, the glass transition temperature and the melting point of the resist are higher than room temperature. More specifically, it is desirable that the resist is sufficiently soft so as to be capable of transferring the patterns of the stamper at a load of 500 bar or more, and that the glass transition temperature is 100° C. or less. Accordingly, as the resist, for example, a novolak resin or the like used in a semiconductor process and spin-on-glass (SOG) can be used. In order to prevent oxidation of the magnetic film, SOG that enables etching without using oxygen RIE is preferable, but it is not limited thereto. The thickness of the resist should be 20 nm or more and 100 nm or less. Moreover, in order to provide conduction at the substrate edge, the resist coated on the substrate edge is rinsed at this stage.

Figure 4B:
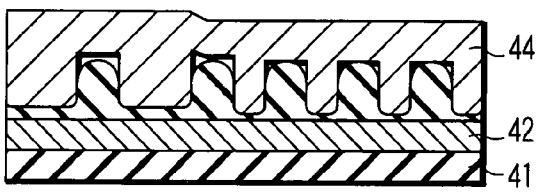
Figure 4F:
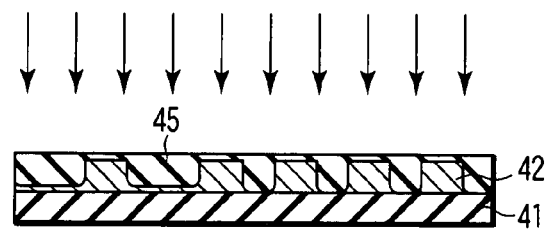

As shown in FIG. 4B, the stamper 44 made of nickel, for example, is pressed against the resist 43, and the patterns of the stamper 44 are transferred to the resist 43 (imprinting).

Figure 4C:
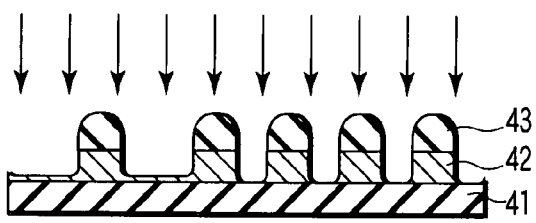
Figure 4G:
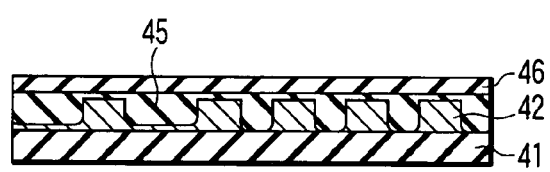

As shown in FIG. 4C, the stamper 44 is removed after the imprinting, and then ion milling is carried out while leaving resist residues in the recesses of the patterned resist 43, so as to etch the resist residues and the magnetic film 42 in the recesses of the resist 43.

In general, the ion milling is used for processing a magnetic metal or the like that cannot be easily processed by reactive ion etching (RIE). Halides of intermediate products formed by the RIE in a process of etching metals such as Cr, Mn, Fe, Co, or Ni contained in a ferromagnetic alloy have high melting points and boiling points, and extremely low vapor pressures at room temperature, and high heat of evaporation. That is, it is difficult to remove these radical reaction products. Thus, the ion milling is used for the processing of a magnetic film. The milling is an etching method utilizing a sputtering phenomenon in which inactive gas such as argon is ionized and field-accelerated to physically sputter off molecules from a material surface, and it is possible to etch almost all of substances. When a magnetic film is etched by the ion milling, an ion incident angle is changed to be 40° and 70° so as to suppress a re-deposition and eliminate damage to the magnetic film.

Conventionally, in the processing of the magnetic film for which the imprinting has been applied, resist residues remained in recesses of the resist patterns are first removed by anisotropic etching such as reactive ion etching (RIE) and inductively-coupled plasma (ICP) so as to suppress variations of the resist residues due to difference in the ratio of recesses to protrusions of the resist patterns and side etching. Subsequently, the magnetic film is processed using the resist patterns as a mask. In this case, as shown in FIG. 2A, magnetic film patterns 12 whose sidewalls are formed by one surface having one slope angle, which arise the aforementioned problems.

Contrary to this, since the ion milling is carried out while leaving the resist residues in the recesses of the resist patterns in the present embodiment, the magnetic film patterns whose sidewalls have a curved face gradually comes to a gentler slope can be formed as shown in FIG. 2C. As a result, the volume of the magnetic film patterns increases to improve the thermal fluctuation resistance.

In the present embodiment, the resist 43 coated on the magnetic film 42 is made thin, and the ion milling is carried out in a state that the resist residues remained in the recesses of the resist patterns after imprinting is also made thin. Thus, side etching can be suppressed. As shown in FIG. 3, by making use of the variations of the resist residues, the height difference of the magnetic film patterns in the region (L1) with a larger area of the recesses can be made smaller than that in the region (L2) with a smaller area of the recesses. As a result, the surface flatness after the filling layer is formed can be improved. As described above, since the magnetic film is etched by ion milling in the state that the resist residues are remained, the shapes of the resist patterns after imprinting can be transferred to the magnetic film, and the same radius of curvature can be provided at the bottom part of the magnetic film patterns even in regions where the occupation area rates of the magnetic film patterns are different.

Although the resist 43 is preferably thin, the resist 43 must be thick enough to function as a mask when the magnetic film 42 is processed. In other words, the resist 43 must be so thick that the resist 43 can fill the recesses of the stamper 44. Therefore, the thickness of the resist 43 should be 20 nm or more and 100 nm or less, as described above.

Figure 4D:
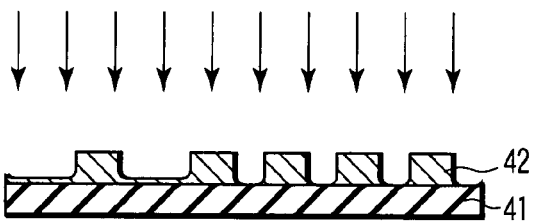

As shown in FIG. 4D, the resist 43 used as the etching mask is removed. A removal method is appropriately selected depending on the material of the resist 43. For example, in the case where SOG is used as the resist 43, it may be removed by means of an ICP etching apparatus using $CF_4$ gas or $SF_6$ gas. However, the removal method is not limited thereto. A treatment for removing impurities on the surface of the processed magnetic film, such as washing, may be carried out as desired.

Figure 4H:
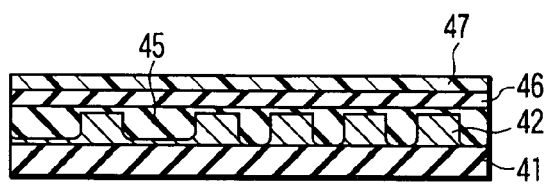

Then, deposition of the filling layer 45 made of a nonmagnetic material (FIG. 4E), flattening by etch-back (FIG. 4F) and deposition of a protective film 46 (FIG. 4G) are carried out. In order to form the filling layer 45, a dry process such as sputtering and CVD, and wet process such as spin-coating may be used, but the process is not limited thereto. Furthermore, a lubricant 47 is coated, as shown in FIG. 4H. In the manner described above, the magnetic recording media according to the present embodiment is manufactured.

According to another embodiment, the resist residues are removed from the recesses of the resist patterns by RIE after imprinting. When the magnetic film is etched by ion milling, the ion incident angles are changed to 40°, 20°, and 70°. With this method, the sidewalls of the magnetic film patterns can be formed by two faces having different slope angles, as shown in FIG. 2B.

A method of manufacturing a magnetic recording media according to another embodiment will be described with reference to FIGS. 5A, 5B, 5C, 5D, 5E, 5F, and 5G. The processes shown in FIGS. 5A to 5C are carried out in a similar manner to those shown in FIGS. 4A to 4C. As shown in FIG. 5D, the resist pattern used as the etching mask in the step of FIG. 5C is not stripped, and the filling layer 45' is filled in the recesses between the magnetic film patterns 42 by wet process such as spin-coating. Then, the processes shown in FIGS. 5E to 5G are carried out in a similar manner to those shown in FIGS. 4F to 4H.

Although RIE can be a cause of corrosion of the magnetic film, the method shown in FIG. 4 does not use RIE for removing the resist residues and the method shown in FIG. 5 does not use RIE for removing the resist residues and stripping the resist patterns. Therefore, the methods shown in FIGS. 4 and 5 are effective in preventing the corrosion of the magnetic film.

Although manufacture of a DTR media has been described above, the methods in the above embodiments can also be applied to manufacture of a patterned media in the narrow sense.

Figure 6:
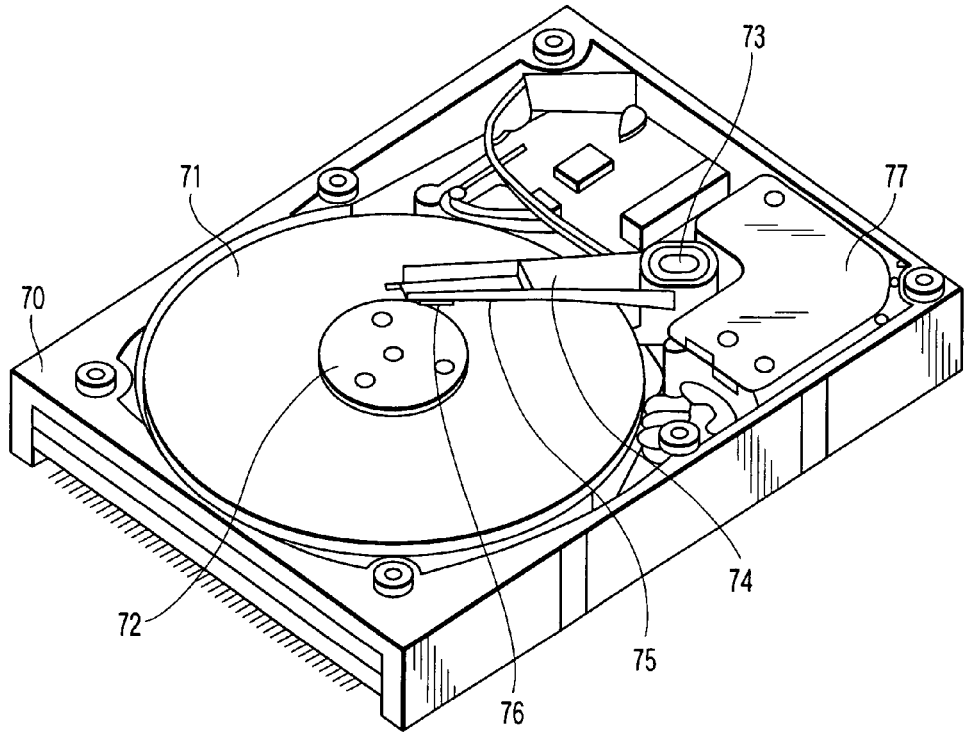
FIG. 6 is a perspective view to show a magnetic recording apparatus according to an embodiment.

FIG. 6 is a perspective view of a magnetic disk apparatus (hard disk drive) according to an embodiment of the present invention. The magnetic disk apparatus comprises, inside a chassis 70, a magnetic disk 71, a head slider 76 including a magnetic head, a head suspension assembly (a suspension 75 and an actuator arm 74) that supports the head slider 76, a voice coil motor (VCM) 77 and a circuit board.

The magnetic disk (discrete track recording media) 71 is mounted on and rotated by a spindle motor 72. Various digital data are recorded on the magnetic disk 71 in perpendicular magnetic recording system. The magnetic head incorporated in the head slider 76 is a so-called integrated head including a write head of a single-pole structure and a read head using a shielded MR read element (such as a GMR film or a TMR film). The suspension 75 is held at one end of the actuator arm 74 to support the head slider 76 so as to face the recording surface of the magnetic disk 71. The actuator arm 74 is attached to a pivot 73. The voice coil motor (VCM) 77, which serves as an actuator, is provided at the other end of the actuator 74. The voice coil motor (VCM) 77 drives the head suspension assembly to position the magnetic head at an arbitrary radial position of the magnetic disk 71. The circuit board comprises a head IC to generate driving signals for the voice coil motor (VCM) and control signals for controlling read and write operations performed by the magnetic head.

Figure 7:
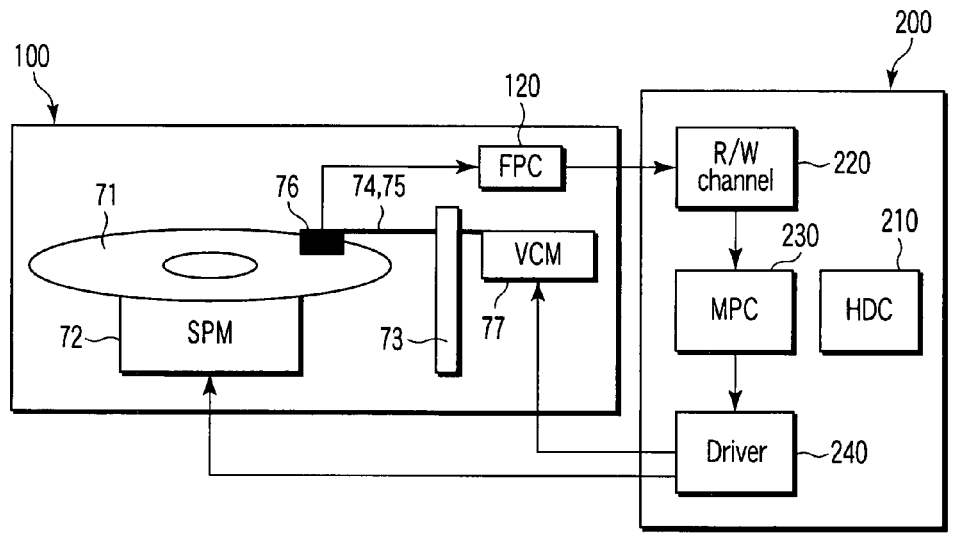
FIG. 7 is a block diagram of a magnetic recording apparatus according to the embodiment.

FIG. 7 shows a block diagram of the magnetic recording apparatus (hard disk drive) according to an embodiment of the present invention. This figure shows the head slider only above the top surface of the magnetic disk. However, the perpendicular magnetic recording layer with discrete tracks is formed on both sides of the magnetic disk. A down head and an up head are provided above the bottom and top surfaces of the magnetic disk, respectively. It should be noted that the drive construction is similar to that of the prior art except that the magnetic disk employed is that according to the embodiment of the invention.

The disk drive includes a main body unit called a head disk assembly (HDA) 100 and a printed circuit board (PCB) 200.

The head disk assembly (HDA) 100 has the magnetic disk 71, the spindle motor 72 which rotates the magnetic disk, the head slider 76 including the read head and the write head, the suspension 75 and actuator arm 74, the voice coil motor (VCM) 77, and a head amplifier (HIC), which is not shown. The head slider 76 is provided with the read head including the GMR element and the write head including the single-pole.

The head slider 76 is elastically supported by a gimbal provided on the suspension 75. The suspension 75 is attached to the actuator arm 74, which is rotatably attached to the pivot 73. The voice coil motor (VCM) 77 generates a torque around the pivot 73 for the actuator arm 74 to move the head in the radial direction of the magnetic disk 71. The head amplifier (HIC) is fixed to the actuator arm 74 to amplify input signals to and output signals from the head. The head amplifier (HIC) is connected to the printed circuit board (PCB) 200 via a flexible print cable (FPC) 120. Providing the head amplifier (HIC) on the actuator arm 74 enables to reduce noise in the head signals effectively. However, the head amplifier (HIC) may be fixed to the HDA main body.

As described above, the perpendicular magnetic recording layer is formed on both sides of the magnetic disk 71, and the servo zones each shaped like a circular arc are formed so as to correspond to the locus of the moving head. The specifications of the magnetic disk meet outer and inner diameters and read/write characteristics adapted to a particular drive. The radius of the circular arc formed by the servo zone is given as the distance from the pivot to the magnet head element.

Four major system LSIs are mounted on the printed circuit board (PCB) 200. The system LSIs are a disk controller (HDC) 210, a read/write channel IC 220, a MPU 230, and a motor driver IC 240.

The MPU 230 is a control unit of a driving system and includes ROM, RAM, CPU, and a logic processing unit which implement a head positioning control system according to the present embodiment. The logic processing unit is an arithmetic processing unit composed of a hardware circuit to execute high-speed calculations. Firmware (FW) for the logic processing circuit is stored in the ROM. The MPU controls the drive in accordance with FW.

The disk controller (HDC) 210 is an interface unit in the hard disk drive which manages the whole drive by exchanging information with interfaces between the disk drive and a host system (for example, a personal computer) and with the MPU, read/write channel IC, and motor driver IC.

The read/write channel IC 220 is a head signal processing unit relating to read/write operations. The read/write channel IC 220 is composed of a circuit which switches the channels of the head amplifier (HIC) and which processes read/write signals in read/write operations.

The motor driver IC 240 is a driver unit for the voice coil motor (VCM) 77 and spindle motor 72. The motor driver IC 240 controls the spindle motor 72 so that the motor 72 can rotate at a constant speed and provides a current, which is determined based on a VCM manipulating variable from the MPU 230, to VCM 77 to drive the head moving mechanism.

EXAMPLES

Hereinafter, the present invention will be described more specifically based on examples.

A DTR media is fabricated using a method of this invention shown in FIG. 4.

As a substrate 41, a lithium-based crystallized glass substrate having a diameter of 1.8 inches is used. After the substrate 41 is washed, it is introduced into a sputtering apparatus, and a soft underlayer, an intermediate layer, and a magnetic layer 42 (perpendicular recording layer) are sequentially formed. A CoZr-based alloy is used for the soft magnetic underlayer, Ru is used for the intermediate layer, and a CoCrPt-based alloy is used for the perpendicular recording layer.

As the resist 43, SOG (OCD T-7 4000T, Tokyo Ohka Kogyo Co., Ltd.) is spin-coated on the magnetic layer 42 at 5,000 rpm. The thickness of the coated resist is about 60 nm.

Then, the resist (SOG) 43 is rinsed in a region of 300 μm from the outer peripheral edge. Cyclohexane is used as the rinsing liquid.

On the other hand, in order to transfer patterns to the resist (SOG) 43, a nickel stamper 44 is prepared. The present embodiment aims to manufacture a DTR media in which the occupation area rates of the magnetic film patterns are: about 50% for an address part and a preamble part of the servo region, about 75% for a burst part of the servo region, and about 67% for a data region, respectively. The stamper 44 has patterns of recesses and protrusions corresponding to the intended DTR media. The height of the protruded patterns of the stamper 44 is 90 nm.

Before imprinting is carried out, a treatment for enhancing releasing property after the imprinting is carried out using a perfluoroalkyl derivative, which is a releasing agent. Firstly, in order to increase adhesiveness between the perfluoroalkyl derivative and the stamper made of nickel, the stamper is oxidized by RIE using oxygen gas for 5 minutes. Then, a coater filled with a solution of perfluoropolyether (HOOC—$CF_2$—O—$(CF_2$—$CF_2$—O$)_m$—$(CF_2$—O$)_n$—$CF_2$—COOH), a perfluoroalkyl derivative, diluted with GALDEN-HT70 (SOLVAY SOLEXIS) is used to coat the stamper 44 with the perfluoroalkyl derivative. Lastly, the stamper 44 is annealed for 10 minutes at 150° C. in nitrogen atmosphere.

By pressing the treated stamper 44 to the resist (SOG) 43 for one minute at 2,000 bar, patterns are transferred to the resist 43. After the patterns are transferred, the depth of the recesses of the resist 43 is 60 to 70 nm, and the thickness of the resist residues is about 30 nm. As a result of observation by a cross-sectional SEM, the radius of curvature at the bottom part of the patterns after imprinting is about 5 nm.

Then, Ar ion milling is carried out while leaving the resist residues to etch the resist residues and the magnetic film. At this time, in order to eliminate damage to the magnetic layer, the ion incident angle is changed to 40° and 70° so as to suppress re-deposition. As a result, the curved face having the slope angle within a range of 40° to 80° is formed on the sidewalls of the magnetic film patterns 42 in a form of protrusion. As a result of observation by means of a cross-sectional TEM, the radius of curvature at the bottom part of patterns after processing of the magnetic film is about 5 nm, which is similar to that after imprinting. When the height differences of the magnetic film patterns are compared between the servo region and the data region, the height difference in the data region is larger by about 5 nm than that in the servo region.

After the magnetic film is processed, the resist 43 of SOG is removed by RIE using $CF_4$. The RIE is carried out at an etching pressure of about 2 mTorr using an inductively-coupled plasma (ICP) etching apparatus.

Then, a carbon film with a thickness of about 100 nm is deposited as the filling layer 45 by sputtering. The carbon film etched back by Ar ion milling until the surface of the magnetic film 42 is exposed so as to flatten the surface. At this time, the ion incident angle is set to 40°. Next, a carbon film with a thickness of about 3 nm is deposited by CVD as a protective film 46 for corrosion prevention. Further, perfluoropolyether is dip-coated to a thickness of about 2 nm as a lubricant 47.

Alternatively, in the steps of removing the resist residues in the recesses of the resist patterns after imprinting and etching the magnetic film by ion milling, the ion incident angle is changed to 40°, 20°, and 70° so as to form two faces having different slope angles on the sidewalls of the magnetic film patterns.

On the other hand, as a comparative example, a DTR media is manufactured using a similar method to that described above, except that the resist residues are removed by RIE using $CF_4$ gas after imprinting. In this case, one face having one slope angle is formed on the sidewalls of the magnetic film patterns in a form of protrusion. As a result of observation by means of cross-sectional TEM, the radius of curvature at the bottom part of the patterns is 1 nm or less. When the height differences of the magnetic film patterns is compared between the servo region and the data region, the difference between them is 1 nm or less.

Alternatively, as another example, a DTR media is manufactured using a method as shown in FIG. 5. In this case, the magnetic film is processed by Ar ion milling without removing the resist residues by RIE, SOG (OCD T-7 4000T; Tokyo Ohka Kogyo Co., Ltd.) is spin-coated at 5,000 rpm to be filled without stripping the resist by RIE, and the flattening by etch-back is carried out by Ar ion milling until the surface of the magnetic film 42 is exposed.

The presence/absence of a cavity, the flatness, and thermal fluctuation resistance are examined with respect to DTR media which have been manufactured as above whose sidewalls of the magnetic film patterns are formed by one face, two faces (the resist residues are removed), or a curved face (without removing the resist residues), respectively. These results are shown in Table 1.

The presence/absence of a cavity is determined based on a cross-sectional image by means of a scanning electron microscope. The cavity is observed only when the sidewalls of the magnetic film patterns are formed by one face having one slope angle.

The flatness is evaluated by measuring the maximum value of the height difference of the magnetic film patterns in a region of 5 μm-square using an atomic force microscope (AFM). As a result, when the sidewalls of the magnetic film patterns are formed by one face having one slope angle, the height difference is 20 nm, which is the largest difference. As can be seen, the recesses between the magnetic patterns cannot be reliably filled by usual sputtering. In contrast to this, when the sidewalls of the magnetic film patterns are formed by two faces having different slope angles or by a curved surface, the height difference of the magnetic film patterns becomes 5 nm or less.

With regard to the thermal fluctuation resistance, change of saturated magnetization with time is observed under an accelerating test and reduction of magnetization is measured on one day later and one week later. In the case where the sidewalls of the magnetic film patterns are formed by one face having one slope angle, a reduction ratio of magnetization is 5% on one day later and is 7% on one week later. When the sidewalls of the magnetic film patterns are formed by a curved surface, the reduction rate of magnetization is 1% on one day later and is 2% on one week later. It is therefore found that the thermal fluctuation resistance is high.

TABLE 1

| | Form of sidewalls | | |
|---|---|---|---|
| | One face | Two faces | Curved face |
| Cavity | present | absent | absent |
| Flatness (Rmax) | 20 nm | 5 nm | 3 nm |
| Reduction rate of magnetization: one day later (%) | 5% | 2% | 1% |
| Reduction rate of magnetization: one week later (%) | 7% | 3% | 2% |

With regard to the DTR media manufactured by a method including the resist residue removal and a method not including the resist residue removal, observation with cross-sectional TEM is carried out after the filling layer (carbon) is filled and before the flattening is carried out by etch-back. With regard to respective DTR media, the total thicknesses of the magnetic layer and the filling layer (carbon) in the recesses are compared between the servo region and the data region where the occupation area rates of the magnetic patterns are different. These results are shown in Table 2.

In the DTR media in which the resist residues are removed by RIE using $CF_4$ gas, the total thickness of the magnetic layer and the filling layer in the data region is thicker than that in the servo region by about 5 nm. Contrary to this, in the DTR media in which the magnetic film is processed without removing of the resist residues and the height differences of the magnetic film patterns are varied depending on regions, the total thicknesses of the magnetic film and the filling layer in the recesses is the same in every region.

TABLE 2

| | Total thickness of magnetic film and filling layer in recesses | |
|---|---|---|
| Resist residue removal | Servo region | Data region |
| performed | 121 nm | 126 nm |
| not performed | 122 nm | 122 nm |

With regard to respective DTR media manufactured as above, the perpendicular coercivity Hc and the reverse magnetic domain nucleation field Hn are examined using a magneto-optical Kerr effect to evaluate deterioration in magnetic characteristics due to corrosion of the magnetic film. The results are shown in Table 3.

As for the magnetic film before processing, the perpendicular coercivity Hc is 4.0 kOe, and the reverse magnetic domain nucleation field Hn is 2.2 kOe. In the DTR media manufactured by the method including the RIE using a fluorine-based gas for removing the resist residues and striping the resist, Hc is increased and Hn is decreased. This means that magnetic characteristics are deteriorated. In the DTR media manufactured by the method in which the resist residues are not removed as described with reference to FIG. 4, Hc is 4.1 kOe and Hn is 2.0 kOe. These characteristics are not very different from those of the unprocessed magnetic film. In the DTR media manufactured by the method in which the resist residues are not removed and the resist is not stripped as described with reference to FIG. 5, the characteristic are least different from those of the unprocessed magnetic film.

TABLE 3

| | Corrosion of magnetic film | | |
|---|---|---|---|
| RIE | Resist residue removal and mask stripping | Mask stripping | None |
| Hc | 4.3 kOe | 4.1 kOe | 4.0 kOe |
| Hn | 1.8 kOe | 2.0 kOe | 2.2 kOe |

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording media comprising:
   a substrate; and
   a magnetic recording layer including magnetic film patterns including a magnetic material formed in a protruded form on the substrate, wherein each of the sidewalls of the magnetic film patterns includes a first face having a first slope angle and a second face having a second slope angle, wherein the first and the second slope angles are non-identical.

2. The magnetic recording media according to claim 1, wherein the sidewalls of the magnetic film patterns are formed by a curved face.

3. The magnetic recording media according to claim 1, wherein a filling layer of a nonmagnetic material is formed in recesses between the magnetic film patterns.

4. The magnetic recording media according to claim 1, wherein the magnetic recording layer includes a data region and a servo region, the magnetic film patterns having different occupation area rates and different height differences between the data region and the servo region.

5. A magnetic recording apparatus comprising:
   the magnetic recording media according to claim 1;
   a spindle motor which rotates the magnetic recording media;
   a head slider incorporating a read/write head; and
   an actuator which positions the head slider incorporating the read/write head on the magnetic recording media.

6. The magnetic recording media according to claim. 1, wherein the slope angle of the sidewall of the magnetic film pattern is made gentle in a region less than one half of a height of the magnetic film pattern.

7. The magnetic recording media according to claim 1, wherein the sidewall of the magnetic film pattern is formed by a curved face which is convex downward.

* * * * *